United States Patent [19]
Campbell

[11] 3,708,392
[45] Jan. 2, 1973

[54] ISOTOPE ENRICHMENT PROCESS FOR LANTHANIDE AND ACTINIDE ELEMENTS
[75] Inventor: David O. Campbell, Oak Ridge, Tenn.
[73] Assignee: The United States of America as represented by the United States Atomic Energy Commission
[22] Filed: Dec. 22, 1970
[21] Appl. No.: 100,773

[52] U.S. Cl. .................................. 176/16, 176/11
[51] Int. Cl. .............................................. G21g 1/00
[58] Field of Search .................... 176/10, 11, 12–14, 176/16

[56] References Cited

UNITED STATES PATENTS

| 3,228,848 | 1/1966 | Fellows | 176/16 |
| 3,228,849 | 1/1966 | Fellows | 176/16 |
| 3,156,523 | 11/1964 | Seaborg | 176/16 |
| 3,167,479 | 1/1965 | Feng | 176/16 |

FOREIGN PATENTS OR APPLICATIONS

| 699,034 | 10/1953 | Great Britain | 176/14 |
| 702,170 | 1/1954 | Great Britain | 176/14 |

Primary Examiner—Carl D. Quarforth
Assistant Examiner—Harvey E. Behrend
Attorney—Roland A. Anderson

[57] ABSTRACT

This invention relates to a method of enriching lanthanide and actinide isotopes which comprises loading at least one target lanthanide or actinide cation onto a finely divided particle of synthetic faujasite, heating said located faujasite at a temperature in the range of 350° to 750° C. to fix said cation, irradiating said previously heated faujasite with a neutron source to induce a $(n, \gamma)$ transmutation reaction, and then selectively eluting a transmutation product having an atomic number greater than the irradiated target cation.

4 Claims, No Drawings

ISOTOPE ENRICHMENT PROCESS FOR LANTHANIDE AND ACTINIDE ELEMENTS

BACKGROUND OF THE INVENTION

The invention described herein was made in the course of, or under, a contract with the U.S. Atomic Energy Commission.

The present invention relates to an isotope enrichment process having particular utility for the production of lanthanide and actinide isotopes with high specific activity. More particularly, the invention relates to the concentration of yttrium, lanthanide, and actinide isotopes resulting from a nuclear transmutation reaction.

As conducive to a clear understanding of the inventive concept involved in the process of the isotope enrichment process to be described, a brief description of the prior art will be given.

In one of its principal practical embodiments, the isotope enrichment process of the present invention employs a modification of the classical Szilard-Chalmers reaction to separate a radioactive product of a $(n,\gamma)$ reaction resulting from the neutron irradiation of a physically and chemically stable target material. In cases where it is desired to employ the Szilard-Chalmers reaction to separate a radioactive product of a $(n,\gamma)$ reaction resulting from the neutron irradiation of a physically and chemically stable target material. In cases where it is desired to employ the Szilard-Chalmers reaction to produce a significant quantity of a nuclear reaction product and enable its separation from the target material, it is necessary to provide a target material which is physically stable at the levels of neutron irradiation required to produce a high yield of isotope product and from which the desired product isotope is chemically separable.

The utility of the Szilard-Chalmers reaction as a method of making enriched isotopes was enhanced by the inventive contribution of Paul Y. Feng as disclosed in his U.S. Pat. No. 3,167,479. Feng employs the technique termed "cation fixation" involving the sorption of target ionic species into aluminum silicate clays, fixing said cations in said clays to a nonleachable condition, irradiating the composite structure with a neutron source, and then finally selectively extracting product nuclei which have gained sufficient recoil energy from the $(n,\gamma)$ process to become removable from the fixed sites of the aluminum silicate lattice structure. The modified Szilard-Chalmers process for the preparation of radioisotopes by the cation fixation technique disclosed in U.S. Pat. No. 3,167,479 was shown to be useful in the preparation of cobalt-60 from cobalt-59 and barium-139 from barium-138.

SUMMARY OF THE INVENTION

With this background of prior art in mind, the present invention involves a unique extension of the cation fixation technique combined with an application of the Szilard-Chalmers reaction to allow the production and isolation of useful quantities of lanthanide and actinide isotopes. The present invention is predicated on the discovery that the naturally occurring zeolite, faujasite, and synthetically produced zeolites such as Linde X and Y, obtainable from Union Carbide Corporation, Linde Division, which are isostructural with faujasite, can be used to fix lanthanide and actinide cations within their peculiar structures so that, upon subsequent exposure to a high-density neutron flux, efficient removal of the resultant $(n,\gamma)$ nuclear transmutation product can be achieved.

The selected zeolite, naturally occurring or synthetically produced faujasite, contains two types of interconnected cavities, called "sodalite cages," approximately 6.6 A in free diameter and interconnected by 2.5 A diameter hexagonal prisms; and large supercages, approximately 12 A in diameter, interconnected by 8 to 9 A-diameter openings with, in addition, four sodalite cages connected to each supercage by 2.4 A openings. The present invention takes advantage of the fact that faujasite has a very strong affinity and selectivity for lanthanide and actinide ions relative to other metal cations. X-ray crystal studies have shown that calcination to a temperature in the range 350° to 750° C. of lanthanide-loaded faujasite causes these cations to migrate from the supercages into the sodalite cages and hexagonal prisms of the faujasite structure, leaving the supercages essentially unoccupied. Moreover, it has been found that lanthanide and actinide exchange is essentially irreversible after calcination.

The present invention utilizes this combination of properties in an isotope separation process which includes an operation which fixes selected lanthanide and actinide target atoms in the small pore system of faujasite by calcination and then irradiates the calcined faujasite to allow the neutron capture product atoms to recoil out of the sodalite cavities generally in the supercage site region. In accordance with this invention it has been found that these recoil atoms can then be more readily exchanged than those remaining in the small pores, resulting in separation of the neutron capture product from the target atoms, thus allowing isotope enrichment.

The following examples are presented as representative embodiments of the invention, illustrating how isotopic enrichment of lanthanide and actinide elements is achieved.

EXAMPLE I—PRASEODYMIUM ENRICHMENT

An aqueous solution of praseodymium nitrate containing 10 milligrams of praseodymium per milliliter was mixed for 1 hour with a batch of crushed pellets of Linde 13X zeolite.

Synthetically produced faujasite such as Types 4A, 5A, and 13X, obtainable from Union Carbide Corporation, are characterized in that, when the water of hydration is driven off, the crystal does not collapse or rearrange, as is the case with most other hydrated materials. Instead, the physical structure of the crystal remains unchanged which results in a network of empty pores and cavities as previously described that comprise about one-half of the total volume of the crystals.

The general chemical formula for Type 4A is 0.96 ± 0.04 $Na_2O \cdot 1.00$ $Al_2O_3 \cdot 1.92 \pm 0.09$ $SiO_2 \cdot x$ $H_2O$. Type 5A is produced from Type 4A through ion exchange of about 75 percent of the sodium ions by calcium ions. The general chemical formula for Type 13X is 0.83 ± 0.05 $Na_2O \cdot 1.00$ $Al_2O_3 \cdot 2.48 \pm 0.03$ $SiO_2 \cdot x$ $H_2O$. Such materials have a pH of approximately 10 and are stable in the 5 to 12 pH range.

Type 4A and Type 5A have the A crystal structure which is cubic, $a_o = 12.32$ angstroms. Removal of crystal water leaves mutually connected intra-crystalline voids amounting to 45 volume percent of the zeolite, with absorption taking place in the intra-crystalline voids.

Type 13X has the X crystal structure which is cubic, $a_o = 24.95$ angstroms, characterized by a three-dimensional network with mutually connected intra-crystalline voids accessible through openings (pores) which will admit molecules with critical dimensions up to 13 angstroms. The void volume is 51 volume percent of the zeolite and all adsorption takes place in the crystalline voids.

For all three types the internal surface area is 700 to 800 square meters per gram and the external area is 1 to 3 square meters. The volume of the voids in cubic centimeters per gram is 0.28 for the A crystal structure and 0.35 for the X crystal structure.

Type 4A, the sodium zeolite, will permit only molecules smaller than about 4 angstroms to enter the cavities and be adsorbed. Type 5A, the calcium zeolite, will admit molecules up to about 5 angstroms in diameter. Type 13X, the sodium zeolite of the X crystal structure, will admit molecules with critical diameters as large as 13 angstroms.

These materials are available in pellet sizes. The pellets are held together with an inert bonding material amounting to 20 percent of the total weight. Type nomenclature denotes the effective pore diameter an angstrom units by number and designates the kind of crystal structure by letter. Thus, Type 4A has an effective pore diameter of 4 angstrom units and an A-type crystal structure.

The loaded zeolite was than separated from the solution, washed with water, dried, and calcined to 500°C. in air. The calcined zeolite particles were then immersed in a praseodymium nitrate solution for several hours at 100°C. to assure a higher degree of exchange between Pr and Na than that obtainable by the first contact. The twice-contacted PrX was than washed, and eluted three times with 11 molar lithium chloride solution to remove any loosely held Pr. Finally, it was contacted twice with 1 molar calcium nitrate solution to remove lithium ion. Lithium is removed because of its high neutron absorption cross section producing helium and tritium, materials which reduce the stability of the faujasite. The essentially lithium-free PrX was washed with water, dried, and heated to 500°C. in air. The resulting PrX contained 3 milliequivalents of praseodymium per gram of zeolite, with calcium occupying most of the remaining capacity. The praseodymium-loaded zeolite, PrX, was then irradiated in the Oak Ridge Research Reactor for about 11 minutes at a flux of approximately $5 \times 10^{13}$ n/cm$^2$·sec at a temperature of less than about 100°C. The irradiated PrX was then eluted three times with 1 milliliter of 11 molar lithium chloride solution. These three eluates were found to contain 58, 6.4, and 1.6 percent, respectively, of the total praseodymium-142 activity produced. The product was enriched in praseodymium-142 by a factor of 37, where enrichment factor is defined as the fraction of praseodymium-142 in the eluate divided by the fraction of praseodymium-141 in the same eluate, and the total praseodymium-142 yield was greater than 50 percent.

In a second experiment, 100 milligrams (as compared to 1.3 mg in the first experiment) of the PrX was irradiated for 30 seconds, leached, and subsequently reirradiated for 1 minute and leached again. The results are summarized in Table I.

TABLE I

Results of Elution after Neutron Irradiation of PrX Zeolite

| Fraction | Treatment | % of Isotope in Fraction $141_{Pr}$ | $141_{Pr}$ |
|---|---|---|---|
| Irradiation No. 1: | 100 mg PrX, 0.5 min. at $5 \times 10^{13}$ n/cm$^2$·sec | | |
| Eluate No. 1: | 1 ml 11 M LiCl, 10 min., 25°C; 0.5 ml 11 M LiCl, 1 min. | 0.71 | 49 |
| Eluate No. 2: | 1 ml 11 M LiCl, 15 min., 90°; 0.5 ml 11 M LiCl, 5 min. | 0.54 | 13 |
| Eluate No. 3: | 1 ml 1 M Ca(NO$_3$)$_2$, 20 min., 90°; 1 ml 1 M Ca(NO$_3$)$_2$, 1 min. | * | 0.8 |
| Remaining in PrX: | | 98 | 37 |
| | Wash PrX; calcine to 450°C.; reirradiate | | |
| Irradiation No. 2: | remaining PrX, 1 min. at $5 \times 10^{13}$ n/cm$^2$·sec | | |
| Eluate No. 1: | 1 ml sat. Na$_2$SO$_4$, 10 min., 25°; 0.5 ml Na$_2$SO$_4$, 5 min. | 0.52 | 40 |
| Eluate No. 2: | 1 ml 11 M LiCl, 15 min., 90°; 0.7 ml 11 M LiCl, 10 min. | 0.59 | 18 |
| Remaining in PrX: | | * | 42 |

*Not determined.

The results show an enrichment factor of about 70 for the first eluate in each irradiation and about 50 for the first two eluates combined. Yields were approximately 60 percent for the first two eluates. Following the second irradiation, sodium sulfate was used as the eluant, with results generally similar to those with lithium chloride elution. The total fractions eluted following the two irradiations were not significantly different. Thus, the irradiation cycle can be repeated using the same PrX zeolite. In general terms, non-acidic eluting solutions such as LiCl, NH$_4$NO$_3$, and Na$_2$SO$_4$ will be effective. To be avoided are acidic solutions which decompose the zeolite and solutions containing complexing agents for aluminum.

The praseodymium-142 resulting from neutron irradiation of the calcined PrX was determined by counting directly with a 3 × 3 inch sodium iodide crystal and a 512-channel analyzer. Resolution was adequate to separate the praseodymium-142 peak from interferences. The praseodymium-141 contents of the eluates were determined subsequently by neutron activation. The praseodymium was recovered from solution by carrying with aluminum hydroxide through several cycles of precipitation, using ammonia, to remove chloride and other impurities. The praseodymium hydroxide was dissolved in nitric acid and the solution evaporated on aluminum foil to prepare targets for neutron activation analysis.

EXAMPLE II—ENRICHMENT OF OTHER LANTHANIDES

The general procedure described in Example I was repeated in order to obtain enrichments of other lanthanide isotopes. Aqueous solutions of neodymium nitrate, erbium nitrate, and thulium nitrate, respectively, were exchanged into Linde 13X by contacting an aqueous solution of the metal nitrate at a pH of about 4 to 5. The exchanged zeolite was washed, dried, and heated to about 500°C. in air to fix the target ions into the small pores of the zeolite. The procedure was repeated in order to maximize loading. Before irradiation, the calcined zeolite was eluted with an appropriate solution, usually 10–11 molar lithium chloride, to remove any readily exchangeable target material, then washed with calcium or magnesium nitrate solution to displace the fissionable lithium ion and then dried. After irradiation, the zeolite was leached with the selected eluant and the activated product in both the zeolite and a sample of the eluate was determined by gamma counting. In most cases, the amount of target material eluted with the product was determined by activation analysis after the product had decayed. Typical results using Linde 13X are summarized in Table II below.

TABLE II

Enrichment of Neutron Capture Product by Zeolite Elution ($\approx$ 3 meq of lanthanide per gram of Linde 13X)

| Description of Procedure | % of Isotope in Fraction | |
| --- | --- | --- |
| | $^{148}$Nd | $^{149}$Nd$^a$ |
| (A) Irradiate 52 mg of NdX$^c$ for 15 sec Elute with: | | |
| 1 ml saturated Na$_2$SO$_4$, 10 min, 90°C | 0.75 | 17 |
| 1 ml 10 M LiCl, 5 min, 90°C | 0.8 | 25 |
| 1 ml 10 M LiCl, 5 min, 90°C | 0.5 | 6 |
| Remaining in NdX | b | 52 |
| | $^{170}$Er | $^{171}$Er$^a$ |
| (B) Irradiate 100 mg of ErX$^c$ for 15 sec Elute with: | | |
| 1 ml 10 M LiCl, 5 min, 25°C | 1.5 | 36 |
| 1 ml 10 M LiCl, 10 min, 90°C | 0.8 | 10 |
| 1 ml 10 M LiCl, 20 min, 90°C | 3.6 | 8 |
| Remaining in ErX | 94 | 46 |
| Wash ErX, ignite to 500°, reirradiate 2 min Elute with: | | |
| 1 ml 10 M LiCl, 1.5 min, 25°C | 0.8 | 25 |
| 1 ml 10 M LiCl, 15 min, 25°C | 0.6 | 11 |
| Remaining in ErX | b | 64 |
| | $^{169}$Tm | $^{170}$Tm$^a$ |
| (C) Irradiate 50 mg of TmX$^c$ for 10 min Elute with: | | |
| 3 ml 10 M LiCl, 15 min, 25°C | b | 36 |
| 3 ml 10 M LiCl, 15 min, 25°C | b | 4 |
| 3 ml 10 M LiCl, 18 hr, 25°C | b | 3 |
| Remaining in TmX | b | 57 |

$^a$Radioactive neutron capture product.
$^b$Not determined.
$^c$NdX, ErX, and TmX designate material calcined to fix the respective lanthanide on Linde 13X.

It has been found that maximum yield of a desired enriched product is a function of the degree of loading of the target material into the faujasite as well as the nature of the cations loaded thereon. Thus, in one case where praseodymium was loaded on the faujasite to exchange only 25 percent of its total capacity, the yield of enriched product was less than 10 percent even after extended elution, whereas the yield at a 40-percent loading of praseodymium resulted in a yield of 23.8 percent of enriched praseodymium isotope after only a short period of elution with 10 M lithium chloride.

EXAMPLE III THE ANOMOLOUS LOADING EFFECT

One of the most surprising and unexpected aspects of this invention is related to the nature of the cations loaded on the faujasite and its effect on the yield of a desired enriched isotope. I have found, for example, that an exceptionally high yield of enriched product is obtained with high lanthanide loadings even though a portion of the rare earth loading is other than the chosen target material. This is shown in Table III below for three separate batches of synthetic faujasite which were all partially loaded to the same praseodymium content.

TABLE III

Effect of Mixed Loading on Yields

| materials: | PrCaX - zeolite, Linde 13X; loading, 30% Pr—70% Ca |
| --- | --- |
| | PrErX - zeolite, Linde 13X; loading, 30% Pr—70% Er |
| | PrYX - zeolite, Linde 13X; loading, 30% Pr—70% Y |
| procedure: | Irradiate 50 mg each for 1 min in Oak Ridge Reactor; then elute with: |
| | L1 - 1 ml 10 M LiCl, 5 min, 25°C, followed by: |
| | L2 - 1 ml 10 M LiCl, 16 hr, 25°C |

| Descrip-tion | Element Analyzed | % of Isotope in Fraction Target | Product | Cumulative % Yield of Product | Cumulative Enrichment Factor |
| --- | --- | --- | --- | --- | --- |
| PrCaX | | | | | |
| L1 | | 0.7 | 15.1 | 15.1 | 22 |
| L2 | Pr$^a$ | 0.6 | 15.5 | 30.6 | 24 |
| Zeolite | | 69.4 | | | |
| PrErX | | | | | |
| L1 | | 0.5 | 50.8 | 50.8 | 102 |
| L2 | Pr$^a$ | 0.4 | 13.2 | 64.0 | 71 |
| Zeolite | | 36 | | | |
| PrYX | | | | | |
| L1 | | 1.2 | 57.4 | 57.4 | 48 |
| L2 | Pr$^a$ | 0.5 | 9.2 | 66.6 | 39 |
| Zeolite | | 33.4 | | | |

$^a$The target is $^{141}$Pr; the product is $^{142}$Pr.

It will be seen that when the remainder of the exchange capacity of the faujasite was loaded with calcium the yield was relatively low. However, when the faujasite was highly loaded with total lanthanides by adding erbium or yttrium (which behaves chemically as a lanthanide), a high yield of enriched praseodymium product was obtained.

EXAMPLE IV—AMERICIUM ENRICHMENT

This example is intended to show a representative embodiment of this invention as it relates to enrichment of an actinide element, americium, and the unusual and highly unexpected results in obtaining high yield of enriched product by employing the "mixed-loading" technique described in the previous example. The present example is composed of two parts. In the first part, a first batch of Linde X synthetic faujasite material was loaded with americium by contacting it with a solution of americium nitrate. A high americium loading was not achieved. Americium-loaded material was then separated from the solution, washed with water, dried at 500°C. in air, and irradiated for 5 minutes in the Oak Ridge Reactor. Elution with lithium chloride removed very little of the americium-241 target material and only about 8.6 percent of the total americium-242 neutron capture product. A second sample of the dried AmX zeolite was contacted with a solution of yttrium nitrate to give a high total loading of americium + yttrium (YAmX). This sample was irradiated for a similar time, and then eluted with lithium chloride solution to give a relatively extremely high yield of the americium-242 product, thus successfully demonstrating isotopic enrichment of an actinide and the unusual and unexpected benefit achieved by employing the mixed-loading technique. The results are summarized in Table V below.

TABLE V

AmX - Linde 10X 30% loaded with $^{241}$Am

YAmX - 30% Am, 70% Y

Irradiate 10 mg each for 5 min in Oak Ridge Reactor; elute each with 1 ml 11 M LiCl for 20 min

|       |         | % of Isotope in Fraction | |
|-------|---------|---------|---------|
|       |         | $^{242}$Am | $^{241}$Am |
| AmX - | eluate  | 3.6  | 0.31 |
|       | zeolite | 96.4 | 99.7 |
| YAmX -| eluate  | 58   | 4.4  |
|       | zeolite | 42   | 95.6 |

Thus, we can see that the yield of Am-242 has been increased by over a factor of 15 when the mixed loading technique was used.

While a principal area of utility of this invention lies in the use of the Szilard-Chalmers reaction to produce separable nuclear transmutation products as described in the foregoing examples, it should be understood that the faujasite material can be used to separate nuclear transmutation products produced by other nuclear reactions, for example, as produced by cyclotron bombardment. Thus, when targets of synthetic faujasite (Linde X) containing absorbed gadolinium isotopes 156, 157 and 158 were bombarded with 40 to 60 Mev alpha particles at intensities up to 5 microamps for 1 hour, nuclear transmutation products Dy-157 and Dy-159 were selectively leached from the targets with yields up to 50 percent.

What is claimed is:

1. A method of separating the isotope product resulting from an $(n,\gamma)$ reaction with a lanthanide or actinide which comprises loading at least one target selected from the group consisting of lanthanide or actinide cations onto finely divided particles of synthetic faujasite by contacting said faujasite with an aqueous solution containing said target cations, heating said loaded faujasite at a temperature in the range 350° to below 700° C. to fix said cations, irradiating said previously heated faujasite with a neutron source to induce a $(n,\gamma)$ transmutation reaction, and then selectively eluting a transmutation product having an atomic number greater than the irradiated target cations.

2. The method according to claim 1 in which the transmutation product is selectively eluted from the heated faujasite containing fixed target cations with an aqueous solution of LiCl, NH$_4$NO$_3$, or Na$_2$SO$_4$.

3. The method according to claim 1 in which the yield of transmutation product is enhanced by loading the faujasite with a mixture consisting of lanthanides or actinides.

4. The method according to claim 1 in which the lanthanide- or actinide-loaded faujasite is washed, prior to neutron irradiation, with an eluant such as LiCl, NH$_4$NO$_3$, or Na$_2$SO$_4$ in order to remove any readily exchangeable target cations.

* * * * *